Figure 1:
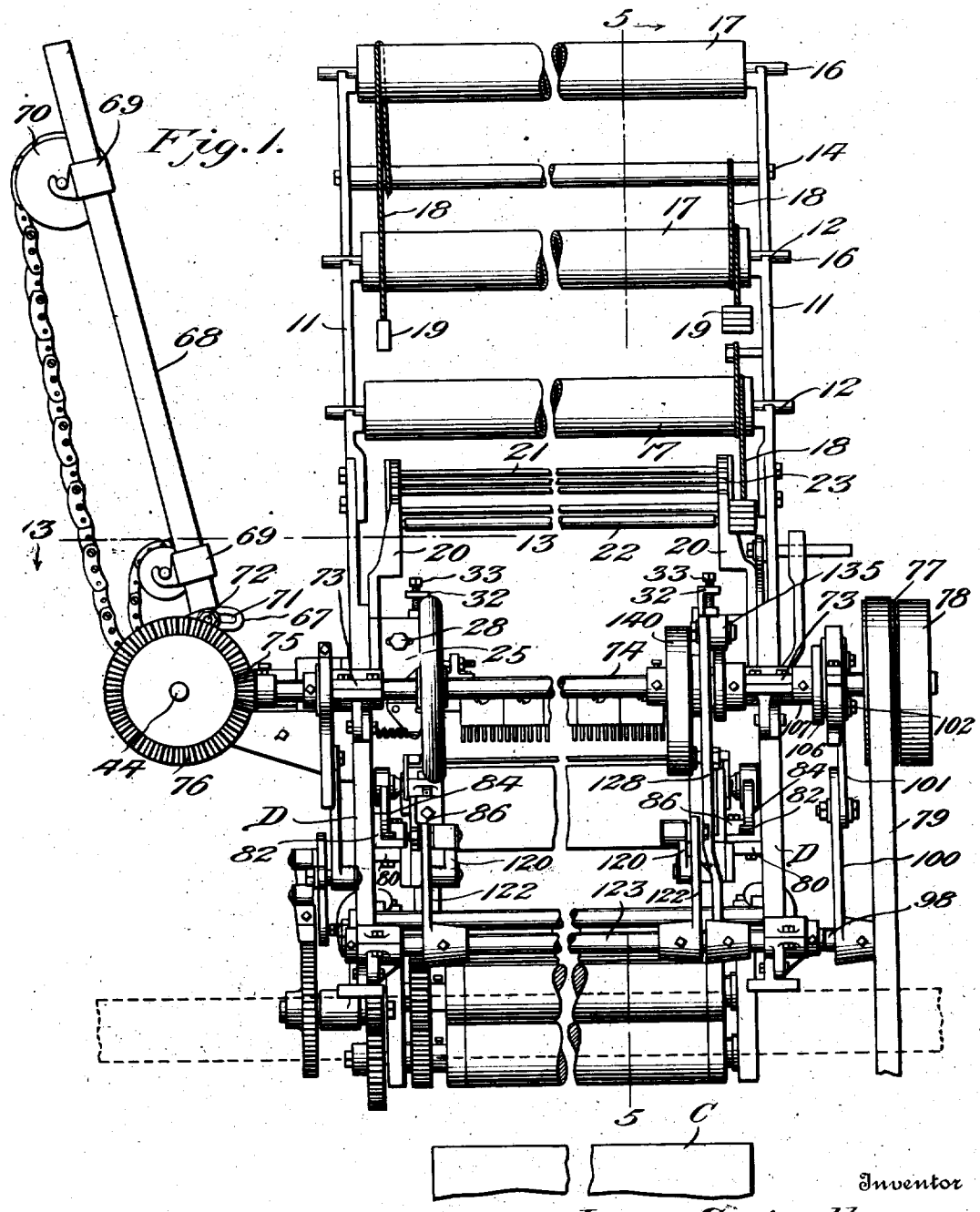

Aug. 26, 1924. Re. 15,901

I. SPRINGTHORPE

LACE KNITTING MACHINE

Original Filed Nov. 6, 1912 10 Sheets-Sheet 1

Inventor

Isaac Springthorpe

By Geo. N. Vanderlip his Attorney

Aug. 26, 1924.

Re. 15,901

I. SPRINGTHORPE

LACE KNITTING MACHINE

Original Filed Nov. 6, 1912 10 Sheets-Sheet 2

Inventor

Isaac Springthorpe

By G. D. Thurlin his Attorney

Aug. 26, 1924. Re. 15,901

I. SPRINGTHORPE

LACE KNITTING MACHINE

Original Filed Nov. 6, 1912 10 Sheets-Sheet 3

Inventor

Isaac Springthorpe

By G. A. Hamlin his Attorney

Aug. 26, 1924. Re. 15,901

I. SPRINGTHORPE

LACE KNITTING MACHINE

Original Filed Nov. 6, 1912 10 Sheets-Sheet 4

Inventor

Isaac Springthorpe

By G. N. Hawkins Jr.

Attorney

Aug. 26, 1924. Re. 15,901

I. SPRINGTHORPE

LACE KNITTING MACHINE

Original Filed Nov. 6, 1912 10 Sheets-Sheet 5

Inventor

Isaac Springthorpe

By W. D. Mauldin Jr. Attorney

Aug. 26, 1924. Re. 15,901

I. SPRINGTHORPE

LACE KNITTING MACHINE

Original Filed Nov. 6, 1912 10 Sheets-Sheet 6

Inventor

Isaac Springthorpe

By G. N. Hamline his Attorney

Aug. 26, 1924. Re. 15,901
I. SPRINGTHORPE
LACE KNITTING MACHINE
Original Filed Nov. 6, 1912 10 Sheets-Sheet 7
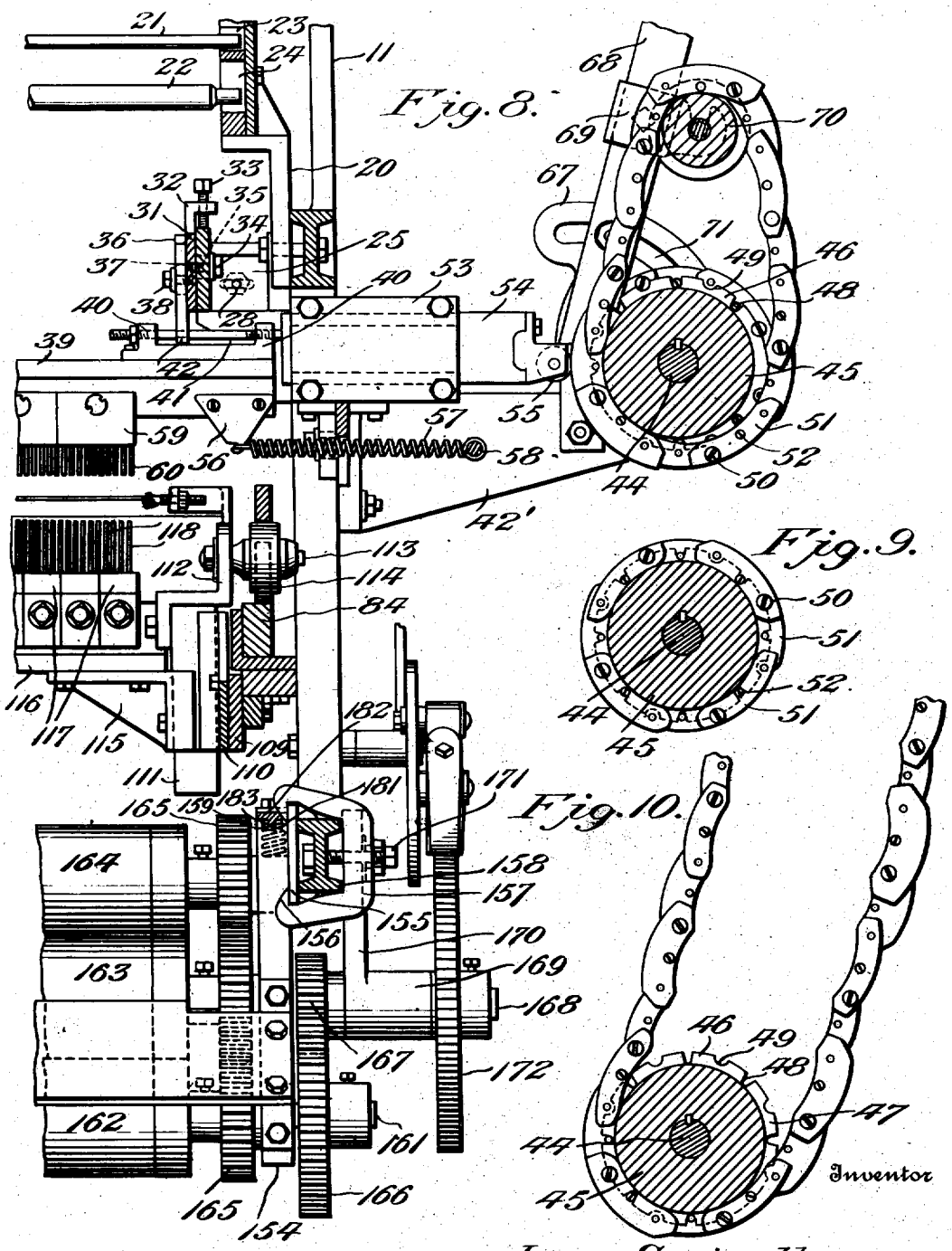
Inventor
Isaac Springthorpe
By G. H. Shaulin his Attorney Aug. 26, 1924. Re. 15,901
I. SPRINGTHORPE
LACE KNITTING MACHINE
Original Filed Nov. 6, 1912 10 Sheets-Sheet 8
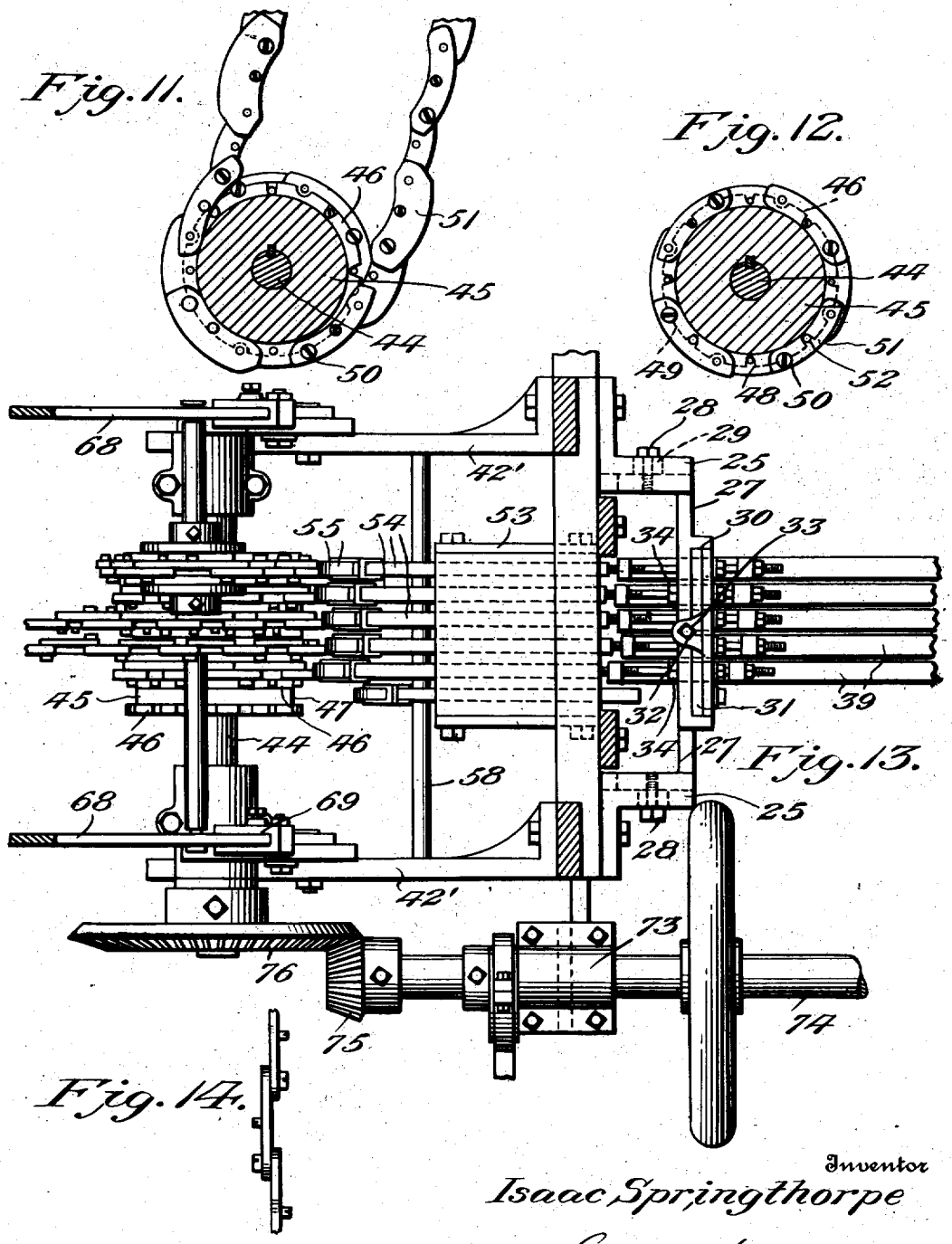
Inventor
Isaac Springthorpe
By G. N. Staubin his Attorney Aug. 26, 1924. Re. 15,901

I. SPRINGTHORPE

LACE KNITTING MACHINE

Original Filed Nov. 6, 1912 10 Sheets-Sheet 9

Inventor

Isaac Springthorpe

By G. H. Haubin his Attorney

Aug. 26, 1924.

I. SPRINGTHORPE

Re. 15,901

LACE KNITTING MACHINE

Original Filed Nov. 6, 1912 10 Sheets-Sheet 10

Inventor

Isaac Springthorpe

By

His Attorneys

Reissued Aug. 26, 1924. Re. 15,901

UNITED STATES PATENT OFFICE.

ISAAC SPRINGTHORPE, OF GERMANTOWN, PENNSYLVANIA, ASSIGNOR, BY MESNE ASSIGNMENTS, TO SPRINGTHORPE TEXTILE MACHINE COMPANY, A CORPORATION OF DELAWARE.

LACE-KNITTING MACHINE.

Original No. 1,165,294, dated December 21, 1915, Serial No. 729,865, filed November 6, 1912. Application for reissue filed July 16, 1917. Serial No. 180,936.

*To all whom it may concern:*

Be it known that I, ISAAC SPRINGTHORPE, a citizen of the United States, residing at Germantown, Philadelphia, in the county of Philadelphia and State of Pennsylvania, have invented certain new and useful Improvements in Lace-Knitting Machines, of which the following is a specification.

The invention relates to fabric knitting machines, and more particularly to the class of machines for the manufacture of pattern lace.

Heretofore, the finess of texture of machine-made lace and also the speed of production have been limited and hampered by the difficulty of accurately and speedily relocating the thread-guides in proper positions to enable the needles to pick up the threads during movements designed for that purpose. Within certain fixed limits of from six to ten thread-guides and needles to the linear inch earlier machines were able to knit from eighty to one hundred courses per minute with a fair degree of accuracy. Any attempt to increase the number of thread-guides and needles to the inch for the purpose of producing finer grades of work has been prevented by the impossibility of locating the moving parts with sufficient accuracy to insure against interference or striking of the thread-guides and needles against each other. Likewise, any effort to increase the speed of the machine, even on coarse work, met with an exactly similar handicap, i. e., inaccurate placing of the thread-guides or insufficient time in which the operative parts could so position the thread-guides as to insure a clear path for the needles. This difficulty will be readily understood when it is remembered that the control and movement of the thread-guides longitudinally has been accomplished by a system of connected links attached to the pattern chain at one end and to the thread-guides at the opposite end. The thread-guides themselves, instead of being rigidly mounted, were suspended in a rocking cradle which swung them in an arc, their arcuate path being intersected at intervals by the needles moving only in a vertical direction.

The object of the present invention is to dispense with the rocking cradle heretofore used and to arrange the thread-guides for sliding movement in straight paths subject to direct and positive actuation by pattern chains which are adapted to be selectively arranged according to the pattern which is to be knitted. By this arrangement of the thread-guides and their direct actuation by the links of the pattern chains, my machine overcomes the limitations as to coordination of needles and thread-guides, speed of operation, and rate of production, as well as fineness of texture inhering in those lace knitting machines heretofore known to the art, and accomplishes perfect coordination of the thread-guides and needles, prevents any interference between them regardless of the number of needles and guides used to the linear inch, greatly increases the speed of the machine and its output for both coarse and fine textures of goods and renders it possible to produce goods having a fineness of texture not heretofore obtained, and a greatly increased rate of production thereof. These advantages are very largely due to the direct and positive operation of the thread-guides by the pattern chains. In practice, the thread-guides are carried by slidable bars which are directly actuated from the pattern chains by slides and are held against the slides by springs but modifications in that respect may be resorted to, the fundamental feature of this part of my machine being the direct and positive actuation of slidable thread-guides by pattern chains.

Whereas the old rocking cradle type of machine may use only from six to twelve thread-guides and needles to the linear inch and knit from eighty to one hundred courses per minute, my machine will successfully operate in producing the finer grades of work when employing as many as twenty-four thread-guides and needles to the linear inch and produce from one hundred to one hundred and fifty courses per minute, that is, with the needle bar operating at the rate of from one and two-thirds to two and one-half movements in each direction per second. During the small fraction of a second between the forward and backward movement of the needle bar, longitudinal readjustment of one or all of the thread-guide bars takes place. This movement may be said to consist in bringing the two to six or more rows of thread-guides into such perfect alinement that the delicate hooks of the needles can pass freely between them at high speed, then suddenly relocating the thread-guides in a new position, from one to twelve or more needles to the right or left, and in such perfect alinement that the needles can again pass through the thread-guides without contact therewith.

The direct actuation of the thread-guides by the pattern chains not only results in greatly increased output in both coarse and fine goods but the quality of goods produced is very high, the variety of patterns which may be knitted is very large, and numerous kinds of goods, other than lace, can be produced on the same machine by proper adjustment.

The primary object of the invention is the provision if a machine wherein the thread guides and needles which cooperate with each other are effectively actuated and controlled so that the knitting of lace of various patterns may be accomplished during the operation of the machine.

Another object of the invention is the provision of a machine of this character wherein the thread guides are controlled and actuated in their movements from a series of specially designed pattern chains, the needles cooperating with the thread guides being vertically, obliquely and horizontally movable for effecting the proper casting of the threads in the formation of the lace fabric, thereby eliminating the usual rocking of the thread guides through an arc and the intersecting of the arc at intervals by the needles, which is common in machines heretofore constructed.

A further object of the invention is the provision of a machine of this character wherein a series of needles will be caused to traverse a triangular path for cooperation with laterally movable thread guides which are actuated and controlled through specially designed pattern chains, thereby knitting a certain pattern of lace fabric without requiring the rocking of the thread guides in an arc and the intersection of the needles at intervals in the arc, thus eliminating complicated mechanism in the machine and assuring positive and effective working thereof with a resultant uniform formation of a lace fabric of any predetermined design.

A still further object of the invention is the provision of a machine of this character wherein the cams for actuating and controlling the movements of the needles may be readily adjusted, thereby varying the course or throw of the needles relative to the path of movement thereof with respect to the thread guides which are simultaneously operated for the proper placing of the threads in the manufacture of lace fabrics of various patterns.

A still further object of the invention is the provision of a machine of this character in which a minimum number of working parts are employed, the said parts being arranged to produce the desired results with minimum movements of the needles and thread guides.

A still further object of the invention is the provision of a machine of this character in which the means for actuating the rows of thread guides consist of link chains, the component parts of which are selected according to the pattern of the lace fabric desired to be knitted.

The pattern chains constitute the design-controlling means of the machine, there being as many chains used when knitting a given fabric as there are thread-guide-carrying bars employed, each chain actuating a given thread-guide bar and determining the frequency of movement and amplitude thereof. Each pattern chain is composed of detachably connected links whose sequence and character are a matter of selection by the knitter, according to the design and character of fabric the machine is to produce. Different links have cam surfaces of different heights and profiles but the unit of variation in the heights of the links will be the same as the distance between any pair of needles or thread guides employed. For instance, if six needles and six thread guides are being used to the linear inch, the unit of variation between the height of the links will be one-sixth of an inch. Thus, a pattern chain link one inch high will cause, by reason of the direct and positive operation of the thread-guide-carrying bars by the pattern chains, a longitudinal movement of the thread-guide bar past six needles. The detachability, reversibility, and interchangeability of the links enables each pattern chain to be selectively set up at will and arranged in any desired relationship to the other pattern chains, the whole comprising a novel controlling means. The pattern chains are positively engaged by, and driven from, drums whereby, once said chains have been selectively set, the drums cause them to repeatedly and invariably carry out their cycle of operations.

While my improved pattern chains are particularly designed and adapted for the direct and positive operation of the thread guide bars in the present machine, they are capable of use in other machines and relationships as an automatic controlling means for effecting a sequence of operations or carrying out a predetermined control of other instrumentalities and I therefore claim them either in combination with the thread-guide bars, or, as a controlling means per se.

A still further object of the invention is the provision of a machine of this character wherein the mechanism thereof is controlled and actuated for the various movements of the needles and thread guides necessary in the knitting of any pattern of lace fabric.

A still further object of the invention is the provision of a machine of this character wherein the lace fabric will be acted upon through the medium of take up mechanism so as to avoid the tangling of the completed work in the parts of the machine or undue stretching thereof during the knitting of the said fabric while the machine is in operation.

Other objects will be obvious and in part pointed out hereinafter.

The invention accordingly consists in the features of construction, combination of elements, and arrangement of parts which will be exemplified in the construction hereinafter set forth, and the scope of the application of which will be indicated in the following claims.

Figure 2:
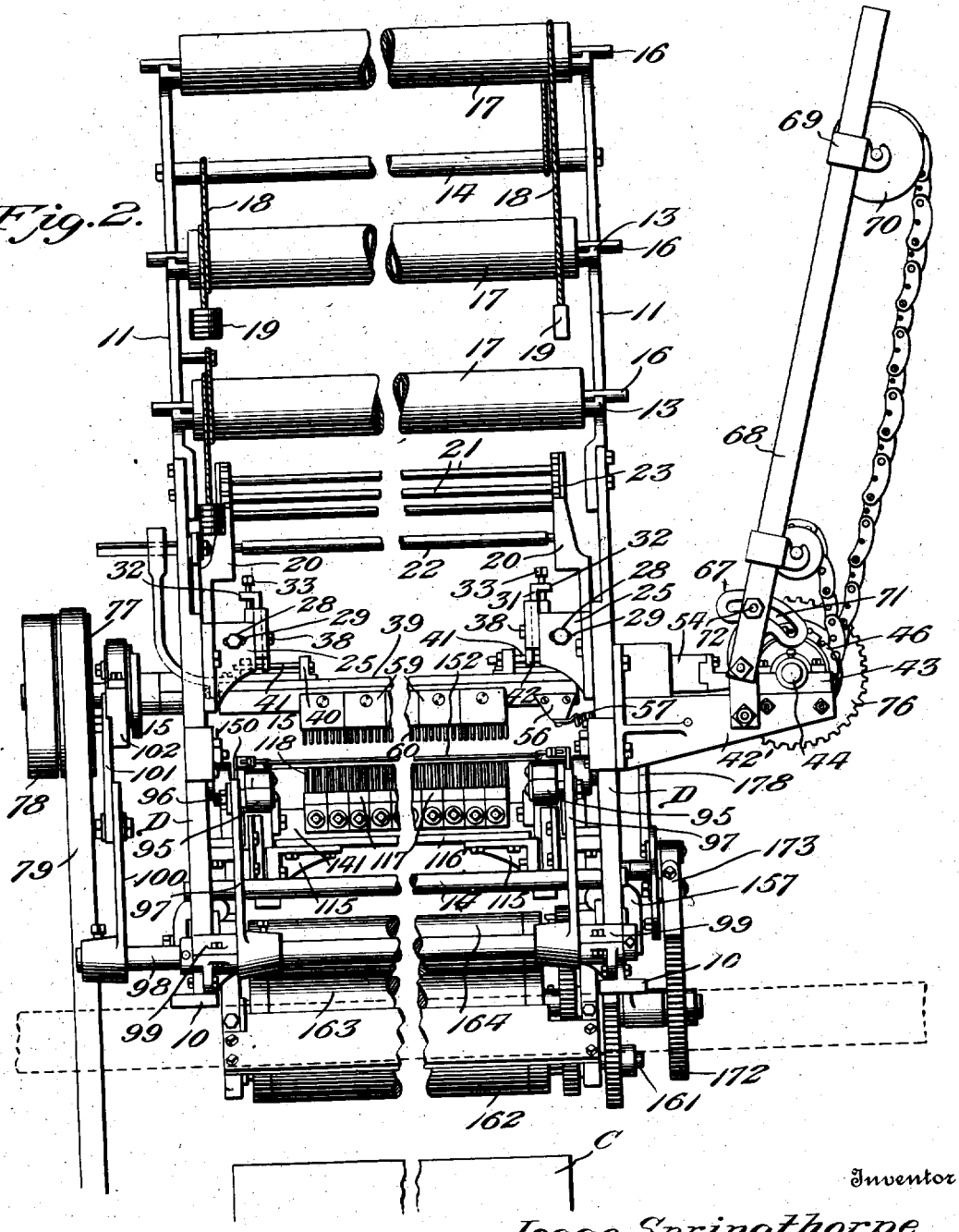
Figure 3:
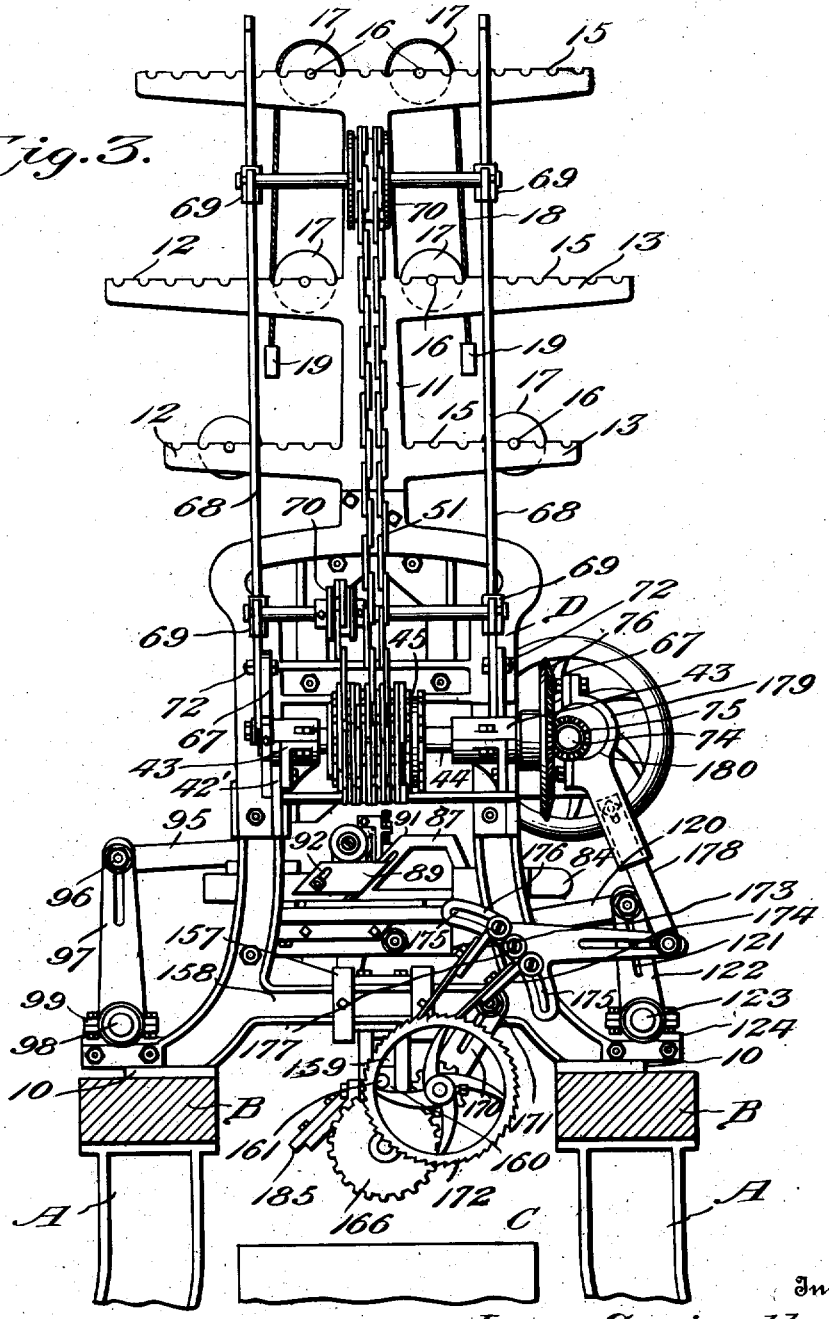
Figure 4:
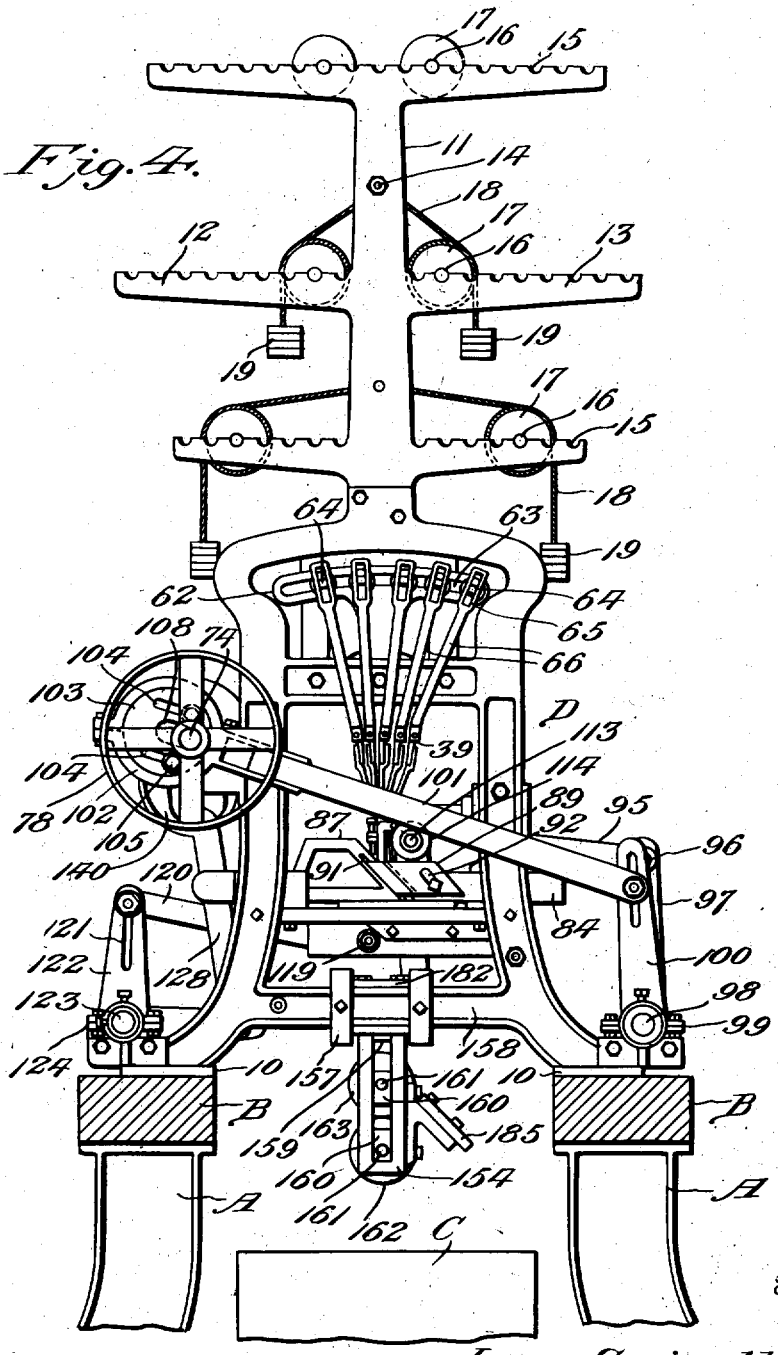
Figure 5:
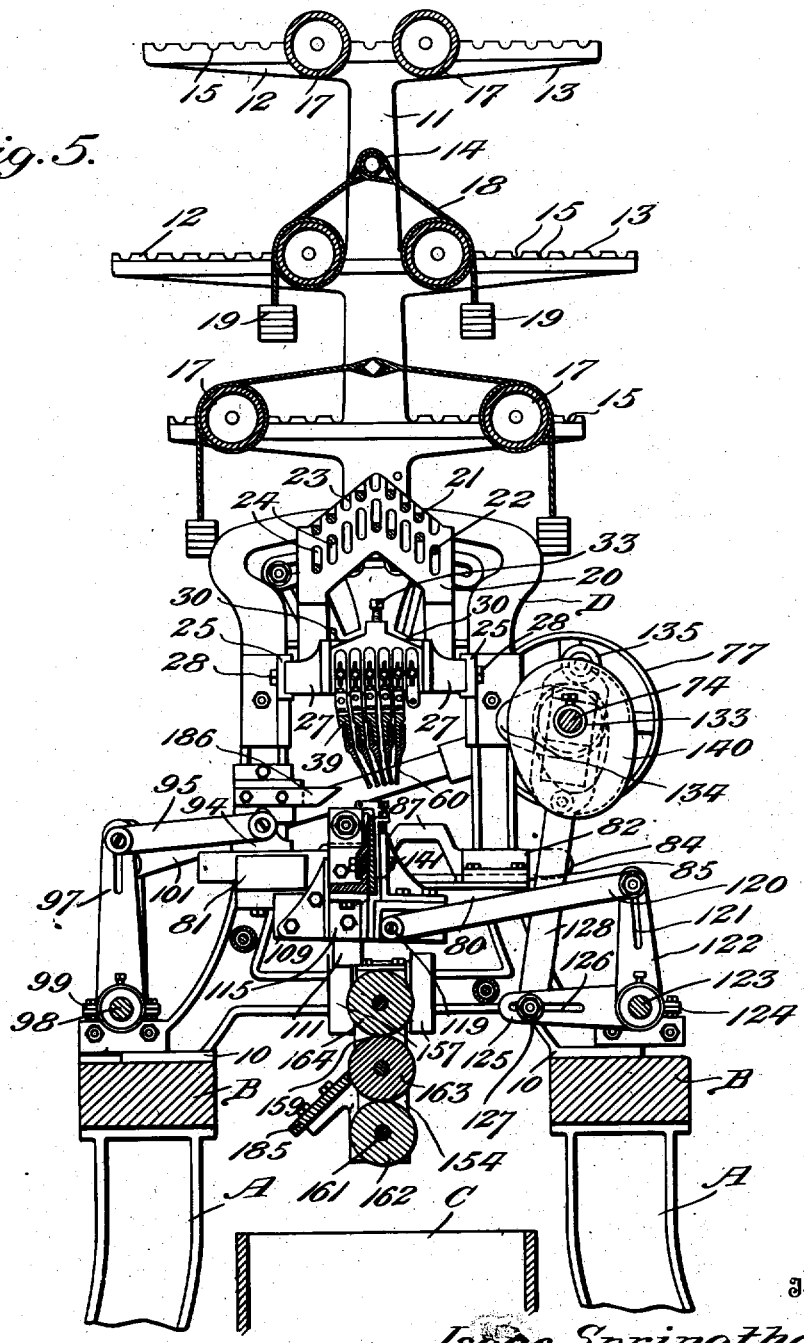
Figure 6:
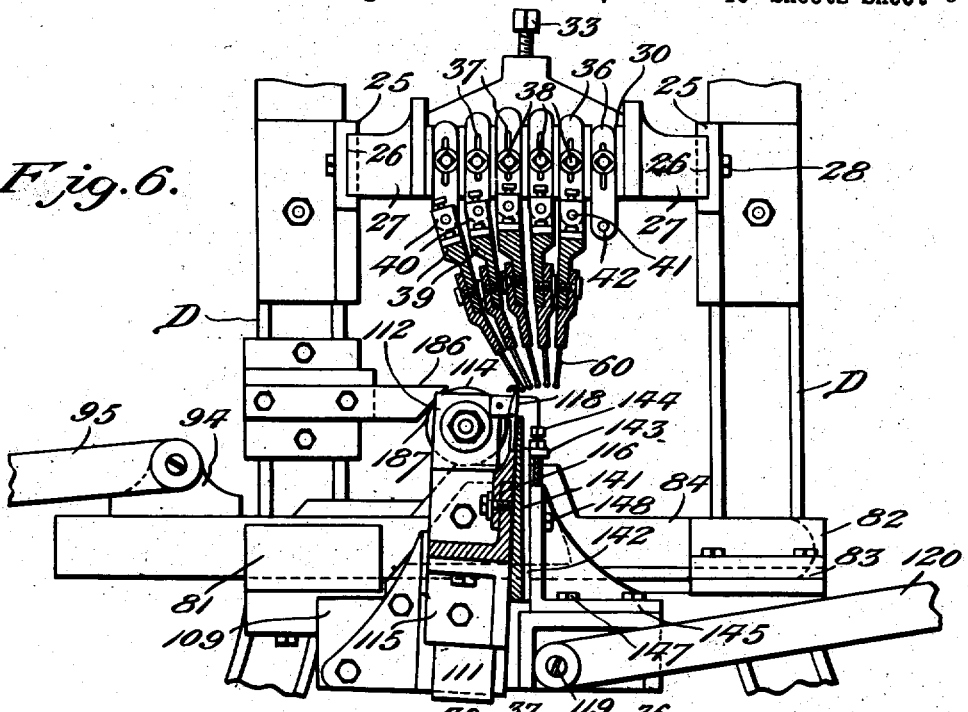
Figure 7:
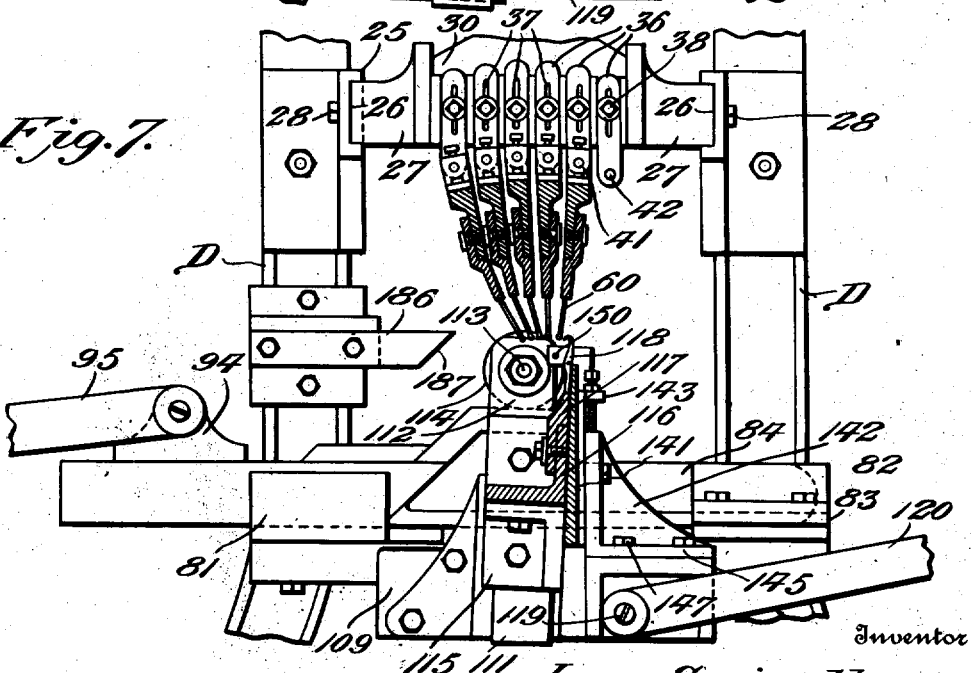
Figure 15:
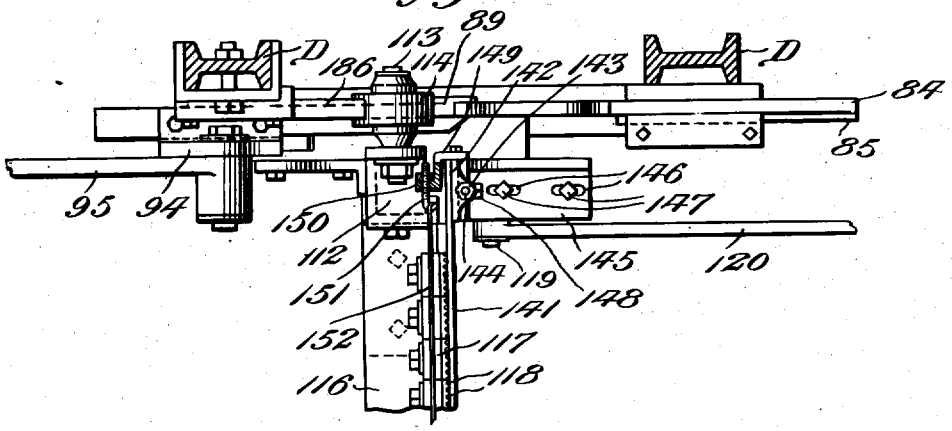
Figure 16:
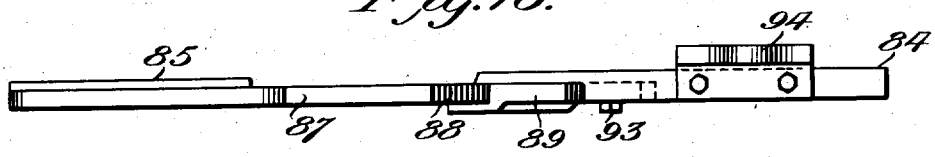
Figure 17:
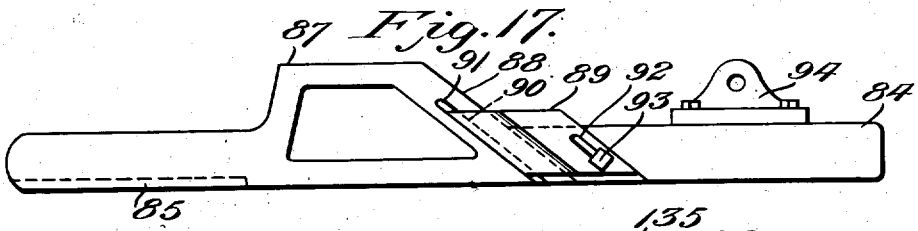
Figure 18:
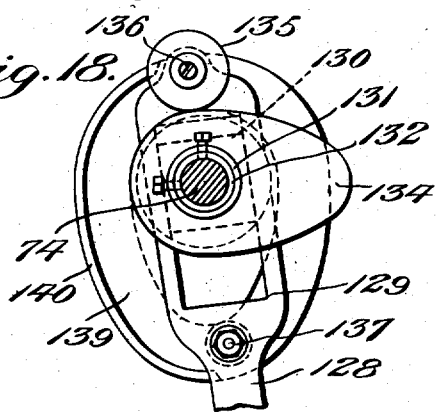
Figure 19:
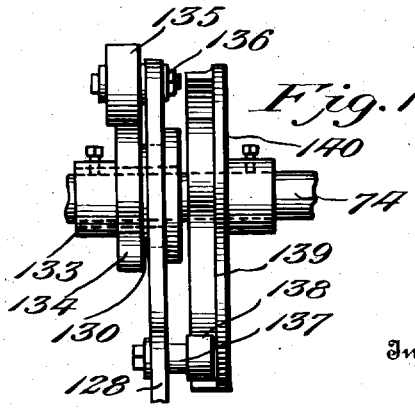
Figure 20:
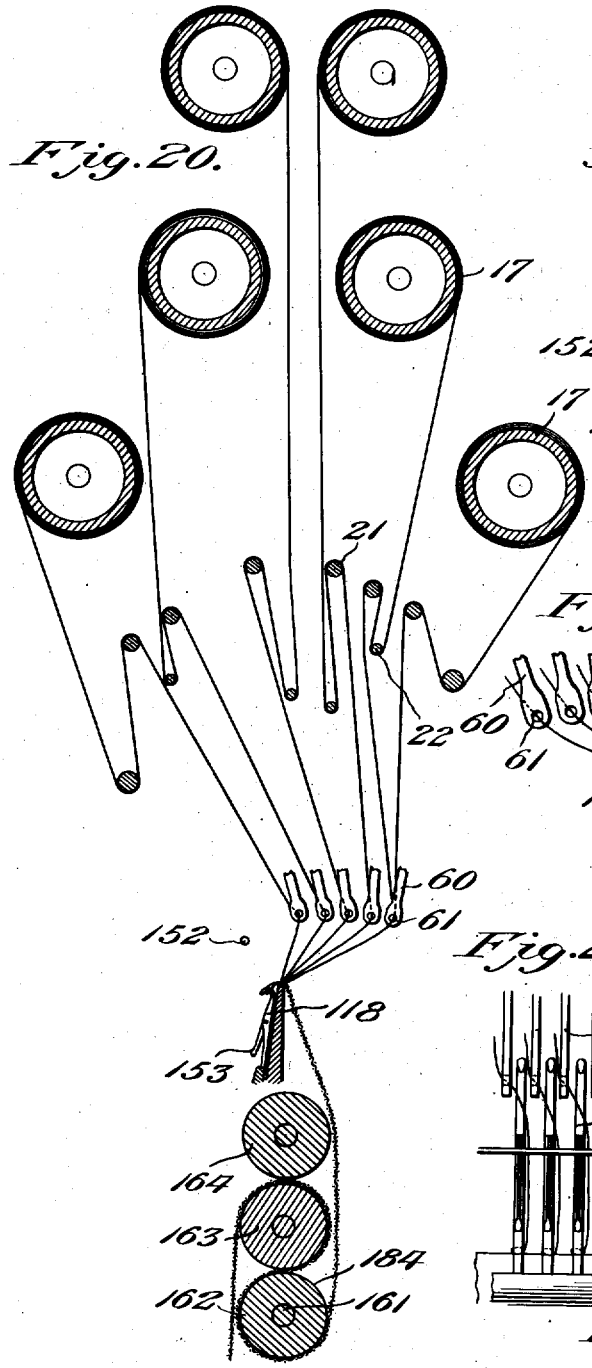
Figure 21:
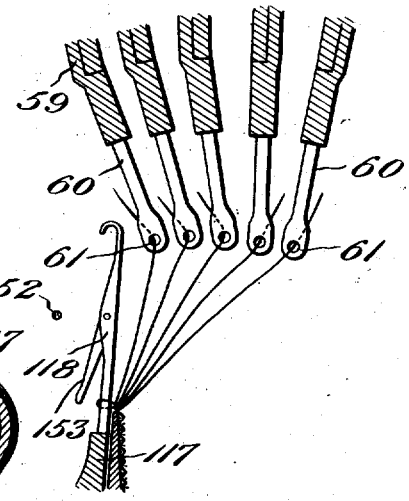
Figure 22:
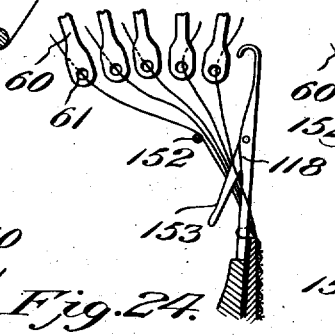
Figure 23:
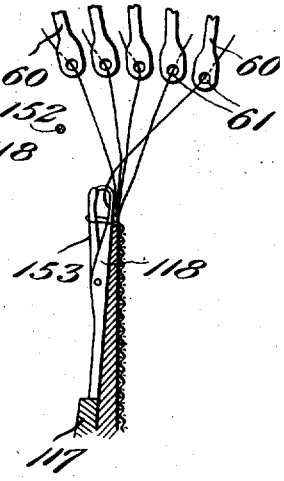
Figure 24:
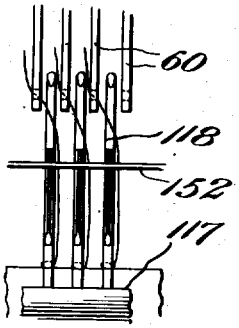

In the drawings: Figure 1 is a fragmentary front elevation of a machine constructed in accordance with the invention. Fig. 2 is a fragmentary rear elevation thereof. Fig. 3 is a side or end elevation of the machine, looking toward the left hand side thereof. Fig. 4 is a similar view, looking toward the right hand side of the machine. Fig. 5 is a vertical, longitudinal sectional view taken on the line 5—5 of Fig. 1, and looking in the direction of the arrow. Fig. 6 is an enlarged fragmentary vertical longitudinal sectional view through the machine, showing the initial operative position of the needles with relation to the thread guides. Fig. 7 is a similar view showing the second or next operative position of the needles with respect to the thread guides. Fig. 8 is an enlarged irregular vertical transverse sectional view through the right hand end of the machine, showing the connection between the pattern chains and the thread guide bar. Fig. 9 is a vertical transverse sectional view through the chain drum, showing one form of pattern chain. Fig. 10 is a similar view showing another form of pattern chain. Fig. 11 is a similar view showing a still further form of pattern chain. Fig. 12 is a similar view showing a still further form of pattern chain. Fig. 13 is a fragmentary sectional view on the line 13—13 of Fig. 1, showing the connection between the thread guide bars and the various pattern chains. Fig. 14 is a fragmentary edge elevation of one of the pattern chains, showing the position of the drive pins and the manner of joining the links of the chains together. Fig. 15 is a fragmentary horizontal transverse sectional view on the line 15—15 of Fig. 2, illustrating one of the reciprocating cam bars which controls the movement of the needle bar. Fig. 16 is a top plan view of one of the reciprocating cam bars. Fig. 17 is a side elevation thereof. Fig. 18 is a fragmentary sectional view through the main drive shaft, showing the cams which operate the reciprocating pitmen for controlling the transverse horizontal movement of the needle bar. Fig. 19 is an end elevation of the part shown in Fig. 18. Fig. 20 is a vertical sectional diagrammatic view illustrating the course of the threads from the warp beams to the work take-up rolls with the needles, work plate and thread guides in their initial position. Fig. 21 is a fragmentary vertical transverse sectional view through a series of the thread guides, showing the relative position of one of the needles, work plate and the said thread guides. Fig. 22 is a view similar to Fig. 21, showing the next relative position of the needle, work plate and thread guides. Fig. 23 is a view similar to Fig. 21, showing the next or final relative position of the needles, work plate and thread guides, with the needles about to cast the stitches formed in the preceding positions. Fig. 24 is a fragmentary rear elevation of the thread guides interposing threads within the path of the open needles.

Similar reference numerals indicate corresponding parts throughout the several views.

Referring more particularly to the drawings, the legs A and cross sills B constitute the base or foundation upon which the machine is supported or rests, and C designates the basket or receptacle for receiving the finished lace fabric product.

The machine comprises a main frame including duplicate sides D, the feet 10 of which are adapted to rest upon the cross sills B of the base or foundation, while bolted or otherwise secured to and rising from the upper end or top of the main frame D is a superposed frame structure comprising duplicate side members 11, the same being formed with forwardly and rearwardly extending spaced alining rack arms 12 and 13, respectively, the main and superposed frame structures having their sides connected together through the medium of tie rods 14, which extend transversely of the said frames and are fastened to the sides thereof in any suitable manner. The rack arms 12 and 13 are formed as usual in their upper edges with spaced alining seats or notches 15, in which are detachably engaged the journaled ends 16 of warp carrying rollers 17, which are arranged in superposed pairs, but it is to be understood that any number of these rollers may be arranged in the superposed structure for the carrying of the required warp threads for the successful and effective operation of the machine. The rollers 17 will be hereinafter referred to as warp beams, and are acted upon by means of brake straps or cords 18 which are trained about the same and also about fixed parts of the frame structure, the ends of the straps or cords being provided with weights 19 which sustain them taut about the beams 17 for controlling the speed of rotation thereof during the working of the machine.

Suitably fixed to the inner faces of the sides D of the main frame at a point spaced below the lowermost warp beams 16 are opposed brackets 20 for supporting an upper series of fixed tension rollers 21 and a lower series of movable tension rollers 22, the brackets being provided with upper and lower series of vertical slots 23 and 24, respectively, in which the ends of the tension rollers are engaged. The upper series of slots 23 open through the top edges of the brackets or supports 20 so as to permit the convenient removal of the upper tension rollers 21, while the lower series of slots 24 are closed at opposite ends to limit the vertical movement of the lower tension rollers 22, the warps or threads from the beam 16 being trained over the said upper and lower tension rollers 21 and 22 when engaged in the thread guides hereinafter described.

Suitably fastened to the sides D of the main frame at the inner faces thereof are L-shaped brackets 25 with opposed horizontal guide grooves 26 in which are engaged adjustable U-shaped yokes 27, the ends of the said yokes being tapped with set screws 28 which are passed through slots 29 formed in the L-shaped brackets 25, and in this manner the said yokes 27 may be secured in adjusted position in the said bracket. Formed centrally in the yokes are vertical guide-ways 30 in which are arranged vertically adjustable gage plates 31, each being formed with an offset ear 32 at its upper edge, in which is threaded an adjusting screw 33, the same being designed to work against the upper edge of the yoke 27, so that the gage plates 31 can be accurately adjusted vertically in the guideway 30, the gage plate 31 being locked in its adjusted position by means of set screws 34 threaded therein and working through vertical slots 35 formed in each yoke 27. The gage plates 31 are arranged opposite each other and carry a series of vertically adjustable guide bar holders 36, each being formed with a vertical slot 37 through which is passed a set screw 38, the same being engaged in the gage plate 31 for adjustably fastening the said holder 36 thereto.

Carried by and laterally movable below the holders 36 is a series of guide bars 39 formed at their upper edges near opposite ends thereof with pairs of spaced lugs 40 in which are mounted adjustable guide pins 41, the same loosely and slidably engaged in perforations 42 formed in the lower ends of the guide bar holder 36, whereby the said guide bars 39 will be slidably suspended by the said holders 36 for lateral movement in the machine.

Fixed to one side D of the main frame, exteriorly thereof are spaced outwardly extending supports 42′ which are formed near their outer ends with split bearings 43 in which is journaled a driven pattern chain drum operating shaft 44 for actuating and controlling the pattern chain mechanism, which comprises a drum 45 formed with a series of spaced peripheral sprocket ribs 46 providing chain receiving channels 47 therebetween, each sprocket rib being formed at intervals with notches 48 and 49 for the engagement therein of the detachable pivots 50 connecting the links 51 of the series of pattern chains and the driving lugs 52 mounted therein, respectively, so that the said pattern chains will be driven by the drum 45 on rotation of the shaft 44, the same being actuated in a manner presently described.

Secured to the side D of the main frame between the supports 42′ in a guide block 53 in which is slidably mounted a series of slides 54 carrying at their outer ends friction rollers 55 which are adapted to engage the cam surfaces of the links 51 of the pattern chains, so that the latter will impart the required movement to the slides which are adapted to engage at their inner ends the adjustable pins 41 to impart the necessary lateral movement to the guide bars 39. Fixed to each guide bar 39 at the end contiguous to the guide block 53 are hook plates 56 which engage one end of a coiled contractile spring 57, the opposite end of which is fixed to a cross tie rod 58 mounted in the supports 42′, the springs 57 being designed to operate upon the guide bars 39 for sustaining the adjustable pins 41 in positive abutting relation to the inner ends of the slides 54, thereby assuring a positive movement to be imparted to the said guide bars from the pattern chains during the operation of the machine.

Detachably fixed to each of the guide bars 39 are anchoring blocks 59, preferably made from lead, in which are anchored a series of thread guides 60, through the eyes 61 of which are trained the warp threads from the warp beams 16 supported in the superposed frame structure of the machine.

Fixed to the side D of the main frame opposite the guide block 53 is a slotted guide sector 62. In the slot 63 therein are adjustably mounted guide pins 64 with which slidably engage the slotted ends 65 of holding arms 66 which are fixed to the right hand ends of the guide bars 39, it being seen that on adjustment of the pins 64 in the slotted sector 62 the guide bars 39 will be sustained angularly adjusted, thereby positioning the thread guides 60 in proper relation to each other.

Fixed to the supports 42′ and rising therefrom are sector-shaped hangers 67 to which are pivoted pattern chain supporting bars or beams 68, on which are adjustably mounted roller supporting brackets 69 in which are journaled pattern chain guide rollers 70 over which travel the pattern chains, the hangers 67 being formed with arcuate-shaped slots 71 in which are engaged locking bolts 72 carried by the bars or beams 68, whereby the latter can be secured in the desired angular position.

Formed at the front of the main frame or connected with the sides D thereof, are split bearings 73 in which is journaled a main driving shaft 74, one end of which has fixed thereto a beveled pinion 75 meshing with a beveled gear 76 fixed to the driven shaft 44 so that motion from the main shaft 74 will be imparted to the driven shaft 44 for operating the pattern chains, while carried at the opposite end of the shaft 74 are tight and loose belt pulleys 77 and 78, respectively, over either of which is trained a shiftable drive belt 79 which is driven from any suitable motive power; the belt 79 when engaged on the fixed pulley 77 will impart rotation to the shaft 74, and on the shifting of the belt to the last pulley 78 the said shaft 74 will remain passive, thus the machine being at a standstill.

Integrally formed with the sides D of the main frame at a point below the thread guides 60 are knee plates 80 having bolted or otherwise fastened to their upper faces near the rear ends thereof angle pieces 81 which serve as guides, while fixed to the front ends of the said knee plates 80 are angle pieces 82, the same being similar to the angle pieces 81 but face in the opposite direction with respect thereto, and have mounted thereon angle guides 83, and movably mounted in the angle pieces 81 and 82 are slidable cam rails 84, the same being formed with laterally extending flanges 85 which are overlapped by angle plates 86 bolted or otherwise fastened to the angle pieces 81 and 82, the cam rails 84 being formed with cam surfaces 87 and 88, respectively, while mounted upon the said rails 84 are diagonally adjustable cam plates 89, each being formed with a flange 90 engaging in a slot 91 provided in the side of each rail 84, and also provided with a slot 92 in which is engaged a securing bolt 93 carried by the cam rail 84, and in this manner the cam plate 89 is secured in adjusted position on the cam rail.

Secured to the upper edges of the cam rails 84 near their rear ends are ears 94 to which are pivoted levers 95 which are also adjustably pivoted at 96 to rocking arms 97 fixed to a rock shaft 98 journaled in bearings 99 carried upon the feet 10 of the sides D of the main frame. Also fixed to the rock shaft 98 is a rocking arm 100 to which is pivotally connected a pitman 101 provided with an eccentric cam ring or strap 102 engaged about an adjustable eccentric disk 103 provided with parallel slots 104 through which are passed adjusting bolts 105, the same being engaged in a disk 106 formed with a central hub 107 fixed to the driving shaft 74, the said eccentric disk 103 being cut away at 108 to accommodate the driving shaft 74 so that the said disk 103 can be readily adjusted by the bolts 105 to increase or decrease the eccentric action thereof for regulating the throw of the pitman 101 for actuating the cam rails 84 for imparting the required sliding movement thereto for operating the needle supporting and operating mechanism, presently described.

Resting upon the upper surfaces of the knee plates 80 between the angle pieces 81 and 82 are downwardly depending bolsters 109 on the inner vertical faces of which are bolted or otherwise secured lift rod guides 110 having slidably engaged therein vertically movable lift rods 111 to the upper ends of which are fixed bearings 112 having mounted therein journaled studs 113 carrying rollers 114 which are adapted to travel upon the cam surfaces of the cam rails 84 and the cam plate 89, for imparting the vertical movement to the lift rods 111, which have bolted thereto brackets 115 supporting a needle bar 116 to which are detachably connected a series of needle anchoring blocks 117 having anchored therein needles 118 each of which is of the usual knitting needle type, the blocks being preferably constructed from lead and are cast about the needles 118 for permanently fastening them therein. Mounted in the forward ends of the bolsters 109 are studs 119 providing pivots connecting arms 120 thereto, which arms are also connected to slotted ends 121 of rocking levers 122 fixed to a rocking shaft 123 journaled in bearings 124 at the front of the main frame of the machine.

Fixed to the rock shaft 123 and extending rearwardly therefrom is a rocking lever 125, to the slotted end 126 of which is pivoted at 127 one end of an eccentric throw arm 128, the same being formed with a slotted end 129 engaged about a square bearing block 130 formed with a hub 131 surrounding a bushing 132 pinned or otherwise fixed to the main shaft 74. Surrounding the bushing 132 at one side of the throw arm 128 is the hub 133 of a cam 134, the hub 133 being fixed to the bushing so as to rotate with the main shaft 74, and the cam 134 is engaged by a cam roller 135 mounted upon a stud 136, fixed to the throw arm 128 at one end of the slot therein, while fixed to the throw arm 128 at the opposite end of the slot therein, and projected opposite the stud 136 is a stud 137 on which is journaled a cam roller 138, the latter engaging in a cam race 139 formed in a cam 140 fixed to the main driving shaft 74, the cam 140 being designed to properly time the downward movement of the throw rod 128, while the cam 134 serves to raise the same at the proper interval, thus giving positive movements to the throw rod 128 for the shifting of the needle bar 116 on the reciprocation of the bolsters 109 and thereby imparting horizontal movement to the needle. The lift rods 111 under the action of the cam surfaces 87 and 88 on the cam rails 84 and the adjustable cam plates 89 will vertically shift the needle bar 116 for the rise and fall of the needles connected therewith, so that the latter will cooperate with the thread guides 60 for the placing of the warp threads in the production of the lace fabric while the machine is in operation.

Arranged against the front faces of the vertical portion of the needle bar 116 is a work plate 141 which is preferably of wedge shape or upwardly tapered, and has riveted at opposite ends thereof supports 142 formed at their upper ends with out-turned ears 143 in which are engaged adjusting screws 144, which are adapted to work against brackets 145 resting upon the bolsters 109, the bases of the brackets being formed with slots 146 through which are passed securing bolts 147 which are engaged in the bolsters 109 and serve to adjustably connect the brackets 145 thereto, the supports connected with the work plate 141 being adjustably connected to the bracket by means of bolts 148, while fixed to the said brackets 145 at the outer side thereof are hangers 149 provided with perforated ears 150 in which are adjustably engaged hooks 151 having connected thereto a latch wire 152, it being seen that by adjusting the hooks 151 the tension of the wire 152 can be increased or decreased as may be required, and this wire 152 is designed to act upon the latches 153 of the needles 118 and the various positions of the said wire relative to the needles 118 are clearly shown in Figs. 20 to 24 inclusive of the drawing.

Arranged below the bolsters 109 and supported by the sides D of the main frame is a take up mechanism for the finished work, comprising a pair of hangers 154 which are formed at their upper ends with cross plates 155 engaged by the hooked ends 156 of clamps 157 which embrace the cross rails 158 of the sides D of the main frame. The hangers 154 are provided with vertical slots 159 in which are mounted displaceable bearings 160 receiving rotatable shafts 161 supporting work take-up rolls 162, 163 and 164, respectively, and these carry meshing gears 165 which are fixed thereto in any suitable manner and impart motion to the take-up rolls, causing the same to move in unison, the shaft 161 on the roll 162 being projected through one of the bearings 160 beyond its hanger 159, and having fixed thereto a gear 166 meshing with a pinion 167 fixed to a stub shaft 168 journaled in a bearing 169, the arm 170 of which is adjustably connected by means of a bolt 171 to the cross rail 158, and this stub shaft 168 has fixed thereto a ratchet feed wheel 172 which is acted upon by means of a pair of pawls or ratchet dogs 173 and 174, respectively, the same being adjustably connected in arcuate shaped slots 175 formed in a rocking lever 176 pivoted at 177 to the side D adjacent thereto of the main frame. The lever 176 has adjustably connected thereto a throw rod 178 provided with an eccentric band or strap 179 engaged about an eccentric 180 fixed to the main driving shaft 74 so that on the rotation of the latter the throw rod 178 will rock the lever 176, thus moving the pawls or dogs 173 and 174, which act upon the ratchet wheel 172 rotating the latter and thereby imparting rotation to the take up rolls 162, 163 and 164 which act upon the finished work for taking up the slack therein and delivering it from the machine.

To aid in casting the stitches it is advantageous to increase the tension of the finished work, and to produce the desired tension the take up rolls 163 and 164 are placed relatively below and in front of the needle bar when in normal or rear position so that the said take up rolls will pull the finished work out of a straight line during the backward movement of the needle bar, thereby increasing the tension upon the finished work. By reason of adjustably mounting the hangers upon the sides D of the main frame of the machine the said hangers can be moved backward or forward on the frame to increase or decrease the amount of excess tension upon the finished work. When increased tension is exerted upon the finished work an accelerated rotation of the take-up rolls is effected by the proper adjustment of the dogs 173 and 174 so as to properly actuate the ratchet wheel 172 whereby the slack in the finished work will be taken up as the needle bar 116 advances.

Arranged within the hangers 154 and acting upon the uppermost bearings 160 are coiled tension springs 181, the same working against top bearing plates 182 fixed to the upper ends of the hangers, and are designed to effect a secure hold on the finished work irrespective of the variance in the thickness of the finished work, the springs 181 being engaged with centering lugs 183 integrally formed on the top plates 182 to avoid a displacement of the springs.

The peripheral surface of the take-up roll 162 is sanded or roughened as at 184 so as to prevent the slipping of the finished work when acted upon by the said take-up roll.

Fixed to one side of the hangers 154 is an inclined guide or shield plate 185 which is interposed in the path of the finished work as it falls from the roller 163 so as to deflect the work outwardly and prevent the contact thereof with the sanded or roughened surface of the roller 162, thereby avoiding interference therewith.

Bolted or otherwise secured to the sides D of the main frame at the rear thereof are fixed cam arms 186 provided with cam ends 187 which oppose the cam surface 88 on the cam rails 84, and are designed to act upon the upper surfaces of the rollers 150 so as to assure the positive lowering of the lift rods 111 carrying the needle bar 116 during the sliding movement thereof in one direction. It is to be understood that the cam arms 186 may be integrally formed with the cam rails 84 in lieu of attaching the same to the sides D of the main frame as shown in the drawings.

The adjustment of the arm 170 formed with the bearing 169 permits the use of varying sized pinions 167 and ratchet feed wheels 172 so that the feed of the take-up rolls can be varied if desired.

The operation of the machine is as follows: The requisite number of warp beams are placed upon the arms 12 and 13 after the said beams have been wound with warp threads, and the brake straps 18 are wound about the ends of the said beams. The free threads are carried downwardly around the tension rollers 21 and 22 and thence in front of, between or at the rear of the various thread guides 60, each thread being inserted in its proper eye 61, as shown in Figs. 20 to 24, inclusive, of the drawings, after which the threads are continued downward and wound about the work take-up rolls 162, 163 and 164, respectively. A pattern or design having been selected which is desired to be knitted, the links 51 of the pattern chains are assembled accordingly and are mounted upon the chain drum 45 and supporting rolls 70, it being seen that the cam faces of the chain links 51 will be engaged by the rollers 55 on the outer ends of the slides 54, and that as the cam faces of the said links vary in height the slides 54 will be moved longitudinally, imparting a like motion to the abutting pins 41 and thus shifting laterally the thread guiding bars 39, the pins 41 being held against the ends of the slides 54 by the tension of the springs 57. As will be readily understood the object of this movement is to draw the various threads across the path of the needles 118 as they move forward and backward through the rows of thread guides. The threads passing through one or more rows of guides 61 will form a base or foundation for the lace fabric, and the manipulation of the other guides 60 as predetermined when assembling the various pattern chains will knit the desired pattern upon this foundation. The latch needles 118 are of a form common to machines of the knitting type, and operate in conjunction with the tapered work plate 141, and it can be said that the hooks of these needles in knitting some patterns of lace move through a path which may be described as a right angle triangle, first rising perpendicularly on the short side of the triangle at the rear side of the machine, then advancing horizontally toward the rows of thread guides 60, during which movement the backs of the needles will engage and carry forward the design threads which have been placed for this purpose by the thread guides, as shown in Figs. 20 to 24 inclusive of the drawings. A manipulation of one or more rows of thread guides then takes place to bring the foundation thread or threads in position for the take up by the needle hooks as the needles 118 again move backwardly and downwardly, the movements of the needles being controlled through the action of the lift rods 111 and the cam rails 84, thus during this downward and backward movement the latches 153 of the needles 118 close to cast the stitches already on the needles, the foundation threads being retained by the hooks in the meanwhile. As heretofore stated, to aid in casting the stitches it is advantageous to increase the tension of the finished work at this period, and to accomplish this take-up mechanism is adjusted in a manner as heretofore set forth. As the needle bar 116 rises the needles 118 move upward through the foundation threads, which now form loops around the bases of the needles and remain in this position until they are in turn cast at the next downward movement of the needle bar. To prevent false movement of the latches 153 of the needles 118 as the needles rise the latch wire 152 acts upon the latches for this purpose. To impart the above described motion to the rows of needles 118 the sliding cam rails 84 are reciprocated longitudinally, the rollers 114 at the ends of the needle bar 116 traverse the horizontal and oblique faces 87, 88 and 89 of the cam rails 84, it being seen that an oblique movement of the needle bar will be produced by moving the bolsters 109 longitudinally on the upper face of the knee plates 30, causing the lift rods 111 to move vertically as the rollers 114 travel up or down the inclined faces of the said cam rails 84 while the latter remain stationary, but a movement of the rails 84 with the bolsters 109 remaining stationary will cause the needle bar to rise or fall vertically, and it is through the combined longitudinal movement of the rails 84 and the horizontal movement of the bolsters 109 on the said knee plates 80 that the variously timed movements of the needles are produced in any direction necessary in conjunction with the lateral movements of the thread guides to knit the pattern desired.

While heretofore it has been described that the needles move in a triangular path, knitting a certain pattern of lace, it is to be clearly understood that this is only one of the paths of movement of the said needles, since other patterns of lace will require different movements of the needles in different paths, for instance, the needles having reached their highest point and advanced through the thread guides may recede through the readjusted guides before beginning their descent to cast the stitches. It is to be clearly understood that various other movements of the needles are provided for through the combined and properly timed movements of the parts hereinbefore set forth and whatever movements are required to knit the desired pattern the needles can be made to traverse the proper paths in conjunction with the movement of the thread guides under the control of the pattern chains to produce the pattern. Now, with reference to the pattern chains it will be noted that the links 51 present cam surfaces and by the detachable screws 50 connecting the links to each other the same may be reversed, thereby varying the action of the pattern chains for controlling the movements of the needle guides. If six needles and six thread guides are provided to the inch, the unit of variation between the height of the links will be one-sixth of an inch. A link one inch high will thus cause a longitudinal movement of a thread guide bar past six needles, while a link one-half an inch high will move the thread guides past three needles. Should finer or coarser needles with a thread guide be used with a correspondingly similar number to the inch, then the unit of variation would of necessity be in accordance therewith. In all cases the unit of variation in the height of the chain links would be the same as the distance between any pair of needles or thread guides. The use of the arms 66 fastened to the end of each guide bar 39 serves as a steadier to properly adjust the various rows of guides laterally with relation to each other and to the needle bar, and the said arms 66 are merely intended to tilt the rows of thread guides to the proper angle and sustain the same against lateral displacement while the needles are traveling back and forth in pulling the foundation and design threads. The adjustable yokes 27 permit the proper adjustment of the thread guide bar hangers 36 to allow of the necessary movement of the adjustable pins 41 engaged in the said hanger. It is necessary that two links of the chain are traversed in each course of the pattern, and that the chain drum is of sufficient circumference to carry eight links in a complete chain.

From the foregoing, it is thought that the construction and operation of the invention will be clearly understood, and therefore a more extended explanation has been omitted.

What is claimed is:—

1. In a knitting machine, a row of vertically, horizontally and obliquely movable needles, a series of angularly adjustable slidable thread guides movable at right angles to the path of movement of the needles, and mechanism for simultaneously moving the needles in the said named directions and also for shifting the thread guides.

2. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, means on the first-named means for obliquely moving the said needles, reciprocating slide cams actuating the lift rods, and means shifting the thread guides.

3. In a knitting machine, a row of vertically, horizontally and obliquely movable needles, a series of angularly adjustable slidable thread guides movable at right angles to the path of movement of the needles, means imparting movement to said guides, lift rods controlling the vertical movement of the needles, means for horizontally shifting the needles, adjustable means on the last-named means for obliquely moving the needles, reciprocating slide cams actuating the lift rods, and means for positively lowering the needles.

4. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, and a series of pattern chains controlling the movements of the slides.

5. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, a series of pattern chains controlling the movements of the slides, and adjustable cams carried by the slide cams.

6. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, a series of pattern chains controlling the movements of the slides, adjustable cams carried by the cam slides, and means simultaneously operating the slide cams, pattern chains and the means for horizontally moving the needles.

7. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, a series of pattern chains controlling the movements of the slides, adjustable cams carried by the slide cams, means simultaneously operating the slide cams, pattern chains and the means for horizontally moving the needles, and take-up mechanism arranged below the needles.

8. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, a series of pattern chains controlling the movements of the slides, adjustable cams carried by the slide cams, means simultaneously operating the slide cams, pattern chains and the means for horizontally moving the needles, take-up mechanism arranged below the needles, and actuating connections between the take-up mechanism and the operating means.

9. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rod, means for positively lowering the needles, horizontally movable slides acting upon the thread guides, a series of pattern chains controlling the movements of the slides, adjustable cams carried by the slide cams, means simultaneously operating the slide cams, pattern chains and the means for horizontally moving the needles, take-up mechanism arranged below the needles, actuating connections between the take-up mechanism and the operating means, and means acting upon the slides for positively holding the same in abutting relation to the pattern chains.

10. In a knitting machine, a row of vertically, horizontally, and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, a series of pattern chains controlling the movements of the slides, adjustable cams carried by the slide cams, means simultaneously operating the slide cams, pattern chains and the means for horizontally moving the needles, take-up mechanism arranged below the needles, actuating connections between the take-up mechanism and the operating means, means acting upon the slides for positively holding the same in abutting relation to the pattern chains, and adjustable abutment pins carried by the thread guides and in engagement with the said slides.

11. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, a series of pattern chains controlling the movements of the slides, adjustable cams carried by the slide cams, means simultaneously operating the slide cams, pattern chains and the means for horizontally moving the needles, take-up mechanism arranged below the needles, actuating connections between the take-up mechanism and the operating means, means acting upon the slides for positively holding the same in abutting relation to the pattern chains, adjustable abutment pins carried by the thread guides and in engagement with the said slides, and means for preventing the latches of the needle snapping upwardly and closing on the rising of the needles.

12. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, a series of pattern chains controlling the movements of the slides, adjustable cams carried by the slide cams, means simultaneously operating the slide cams, pattern chains and the means for horizontally moving the needles, take-up mechanism arranged below the needles, actuating connections between the take-up mechanism and the operating means, means acting upon the slides for positively holding the same in abutting relation to the pattern chains, adjustable abutment pins carried by the thread guides and in engagement with the said slides, means for preventing the latches of the needles snapping upwardly and closing on the rising of the needles, and means for adjusting the last-named means.

13. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, a series of pattern chains controlling the movements of the slides, adjustable cams carried by the slide cams, means simultaneously operating the slide cams, pattern chains and the means for horizontally moving the needles, take up mechanism arranged below the needles, actuating connections between the take-up mechanism and the operating means, means acting upon the slides for positively holding the same in abutting relation to the pattern chains, adjustable abutment pins carried by the thread guides and in engagement with the said slides, means for preventing the latches of the needles snapping upwardly and closing on the rising of the needles, means for adjusting the last-named means, and guides horizontally supporting the slide cams.

14. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, a series of pattern chains controlling the movements of the slides, adjustable cams carried by the slide cams, means simultaneously operating the slide cams, pattern chains and the means for horizontally moving the needles, take-up mechanism arranged below the needles, actuating connections between the take-up mechanism and the operating means, means acting upon the slides for positively holding the same in abutting relation to the pattern chains, adjustable abutment pins carried by the thread guides and in engagement with the said slides, means for preventing the latches of the needles snapping upwardly and closing on the rising of the needles, means for adjusting the last-named means, guides horizontally supporting the slide cams, and a plurality of warp beams adjustably supported above the thread guides.

15. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, a series of pattern chains controlling the movements of the slides, adjustable cams carried by the slide cams, means simultaneously operating the slide cams, pattern chains and the means for horizontally moving the needles, take-up mechanism arranged below the needles, actuating connections between the take-up mechanism and the operating means, means acting upon the slides for positively holding the same in abutting relation to the pattern chains, adjustable abutment pins carried by the thread guides and in engagement with the said slides, means for preventing the latches of the needles snapping upwardly and closing on the rising of the needles, means for adjusting the last-named means, guides horizontally supporting the slide cams, a plurality of warp beams adjustably supported above the thread guides, and brakes controlling the warp beams.

16. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, a series of pattern chains controlling the movements of the slides, adjustable cams carried by the slide cams, means simultaneously operating the slide cams, pattern chains and the means for horizontally moving the needles, take-up mechanism arranged below the needles, actuating connections between the take-up mechanism and the operating means, means acting upon the slides for positively holding the same in abutting relation to the pattern chains, adjustable abutment pins carried by the thread guides and in engagement with the said slides, means for preventing the latches of the needles snapping upwardly and closing on the rising of the needles, means for adjusting the last-named means, guides horizontally supporting the slide cams, a plurality of warp beams adjustably supported above the thread guides, brakes controlling the warp beams, and means for increasing or decreasing the throw of the operating means.

17. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, a series of pattern chains controlling the movements of the slides, adjustable cams carried by the slide cams, means simultaneously operating the slide cams, pattern chains and the means for horizontally moving the needles, take-up mechanism arranged below the needles, actuating connections between the take-up mechanism and the operating means, means acting upon the slides for positively holding the same in abutting relation to the pattern chains, adjustable abutment pins carried by the thread guides and in engagement with the said slides, means for preventing the latches of the needles snapping upwardly and closing on the rising of the needles, means for adjusting the last-named means, guides horizontally supporting the slide cams, a plurality of warp beams adjustably supported above the thread guides, brakes controlling the warp beams, means for increasing or decreasing the throw of the operating means, and series of fixed and vertically movable tension rods arranged between the thread guides and the warp beams.

18. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, a series of pattern chains controlling the movements of the slides, adjustable cams carried by the slide cams, means simultaneously operating the slide cams, pattern chains and the means for horizontally moving the needles, take-up mechanism arranged below the needles, actuating connections between the take-up mechanism and the operating means, means acting upon the slides for positively holding the same in abutting relation to the pattern chains, adjustable abutment pins carried by the thread guides and in engagement with the said slides, means for preventing the latches of the needles snapping upwardly and closing on the rising of the needles, means for adjusting the last-named means, guides horizontally supporting the slide cams, a plurality of warp beams adjustably supported above the thread guides, brakes controlling the warp beams, means for increasing or decreasing the throw of the operating means, series of fixed and vertically movable tension rods arranged between the thread guides and the warp beams, and means for adjusting the take-up mechanism.

19. In a knitting machine, a row of vertically, horizontally and obliquely movable needles, a series of angularly adjustable slidable thread guides movable at right angles to the path of movement of the needles, lift rods controlling the vertical movement of the needles, means for horizontally shifting the needles, reciprocating slide cams actuating the lift rods, means for positively lowering the needles, horizontally movable slides acting upon the thread guides, a series of pattern chains controlling the movements of the slides, adjustable cams carried by the slide cams, means simultaneously operating the slide cams, pattern chains and the means for horizontally moving the needles, take-up mechanism arranged below the needles, actuating connections between the take-up mechanism and the operating means, means acting upon the slides for positively holding the same in abutting relation to the pattern chains, adjustable abutment pins carried by the thread guides and in engagement with the said slides, means for preventing the latches of the needles snapping upwardly and closing on the rising of the needles, means for adjusting the last-named means, guides horizontally supporting the slide cams, a plurality of warp beams adjustably supported above the thread guides, brakes controlling the warp beams, means for increasing or decreasing the throw of the operating means, series of fixed and vertically movable tension rods arranged between the thread guides and the warp beams, means for adjusting the take-up mechanism, and means for adjusting the connections between the take-up mechanism and the operating means.

20. In a knitting machine of the character described, a main frame, a superframe supported thereby and having notched arms, a plurality of warp beams adjustably engaging the notched arms, flexible weighted brake straps acting upon the said beams, chain pattern mechanism supported by the main frame, laterally movable guide bars mounted in the main frame, means for angularly adjusting the guide bars with relation to each other, thread guides mounted upon said guide bars, slides arranged between the said guide bars and the pattern chain mechanism and operative by the latter for laterally shifting the said guide bars, and vertically, horizontally and diagonally movable needles cooperative with the thread guides.

21. In a knitting machine of the character described, a main frame, a superframe supported thereby and having notched arms, a plurality of warp beams adjustably engaging the notched arms, flexible weighted brake straps acting upon the said beams, chain pattern mechanism supported by the main frame, laterally movable guide bars mounted in the main frame, means for angularly adjusting the guide bars with relation to each other, thread guides mounted upon said guide bars, slides arranged between the said guide bars and the pattern chain mechanism and operative by the latter for laterally shifting the said guide bars, vertically, horizontally and diagonally movable needles cooperative with the thread guides, and means for horizontally shifting the needles, and reciprocating means for controlling the vertical and diagonal movements of the needles.

22. In a knitting machine of the character described, a main frame, a superframe supported thereby and having notched arms, a plurality of warp beams adjustably engaging the notched arms, flexible weighted brake straps acting upon the said beams, chain pattern mechanism supported by the main frame, laterally movable guide bars mounted in the main frame, means for angularly adjusting the guide bars with relation to each other, thread guides mounted upon said guide bars, slides arranged between the said guide bars and the pattern chain mechanism and operative by the latter for laterally shifting the said guide bars, vertically, horizontally and diagonally movable needles cooperative with the thread guides, means for horizontally shifting the needles, reciprocating means for controlling the vertical and diagonal movements of the needles, and take-up mechanism arranged below the said needles.

23. In a knitting machine of the character described, a main frame, a superframe supported thereby and having notched arms, a plurality of warp beams adjustably engaging the notched arms, flexible weighted brake straps acting upon the said beams, chain pattern mechanism supported by the main frame, laterally movable guide bars mounted in the main frame, means for angularly adjusting the guide bars with relation to each other, thread guides mounted upon said guide bars, slides arranged between the said guide bars and the pattern chain mechanism and operative by the latter for laterally shifting the said guide bars, vertically, horizontally and diagonally movable needles cooperative with the thread guides, means for horizontally shifting the needles, reciprocating means for controlling the vertical and diagonal movements of the needles, take-up mechanism arranged below the said needles, and means for adjusting the relative position of the take-up mechanism with respect to the said needles.

24. In a knitting machine of the character described, a main frame, a superframe supported thereby and having notched arms, a plurality of warp beams adjustably engaging the notched arms, flexibly weighted brake straps acting upon the said beams, chain pattern mechanism supported by the main frame, laterally movable guide bars mounted in the main frame, means for angularly adjusting the guide bars with relation to each other, thread guides mounted upon said guide bars, slides arranged between the said guide bars and the pattern chain mechanism and operative by the latter for laterally shifting the said guide bars, vertically, horizontally and diagonally movable needles cooperative with the thread guides, means for horizontally shifting the needles, reciprocating means for controlling the vertical and diagonal movements of the needles, take-up mechanism arranged below the said needles, means for adjusting the relative position of the take-up mechanism with respect to the said needles, and an adjustable work plate arranged at one side of the needles.

25. In a knitting machine of the character described, a main frame, a superframe supported thereby and having notched arms, a plurality of warp beams adjustably engaging the notched arms, flexible weighted brake straps acting upon the said beams, chain pattern mechanism supported by the main frame, laterally movable guide bars mounted in the main frame, means for angularly adjusting the guide bars with relation to each other, thread guides mounted upon said guide bars, slides arranged between the said guide bars and the pattern chain mechanism and operative by the latter for laterally shifting the said guide bars, vertically, horizontally and diagonally movable needles cooperative with the thread guides, means for horizontally shifting the needles, reciprocating means for controlling the vertical and diagonal movements of the needles, take-up mechanism arranged below the said needles, means for adjusting the relative position of the take-up mechanism with respect to the said needles, an adjustable work plate arranged at one side of the needles, and a latch wire mounted upon the work plate for automatically controlling the latches of the needles.

26. In a knitting machine of the character described, a main frame, a superframe supported thereby and having notched arms, a plurality of warp beams adjustably engaging the notched arms, flexible weighted brake straps acting upon the said beams, chain pattern mechanism supported by the main frame, laterally movable guide bars mounted in the main frame, means for angularly adjusting the guide bars with relation to each other, thread guides mounted upon said guide bars, slides arranged between the said guide bars and the pattern chain mechanism and operative by the latter for laterally shifting the said guide bars, vertically, horizontally and diagonally movable needles cooperative with the thread guides, means for horizontally shifting the needles, reciprocating means for controlling the vertical and diagonal movements of the needles, take-up mechanism arranged below the said needles, means for adjusting the relative position of the take-up mechanism with respect to the said needles, an adjustable work plate arranged at one side of the needles, a latch wire mounted upon the work plate for automatically controlling the latches of the needles, and adjustable abutting means carried by the guide bars and engageable with the slides.

27. In a knitting machine of the character described, a main frame, a superframe supported thereby and having notched arms, a plurality of warp beams adjustably engaging the notched arms, flexible weighted brake straps acting upon the said beams, chain pattern mechanism supported by the main frame, laterally movable guide bars mounted in the main frame, means for angularly adjusting the guide bars with relation to each other, thread guides mounted upon said guide bars, slides arranged between the said guide bars and the pattern chain mechanism and operative by the latter for laterally shifting the said guide bars, vertically, horizontally and diagonally movable needles cooperative with the thread guides, means for horizontally shifting the needles, reciprocating means for controlling the vertical and diagonal movement of the needles, take-up mechanism arranged below the said needles, means for adjusting the relative position of the take-up mechanism with respect to the said needles, an adjustable work plate arranged at one side of the needles, a latch wire mounted upon the work plate for automatically controlling the latches of the needles, adjustable abutting means carried by the guide bars and engageable with the slides, and vertically adjustable hangers for the said guide bars.

28. In a knitting machine of the character described, a main frame, a superframe supported thereby and having notched arms, a plurality of warp beams adjustably engaging the notched arms, flexible weighted brake straps acting upon the said beams, chain pattern mechanism supported by the main frame, laterally movable guide bars mounted in the main frame, means for angularly adjusting the guide bars with relation to each other, thread guides mounted upon said guide bars, slides arranged between the said guide bars and the pattern chain mechanism and operative by the latter for laterally shifting the said guide bars, vertically, horizontally and diagonally movable needles cooperative with the thread guides, means for horizontally shifting the needles, reciprocating means for controlling the vertical and diagonal movements of the needles, take-up mechanism arranged below the said needles, means for adjusting the relative position of the take-up mechanism with respect to the said needles, an adjustable work plate arranged at one side of the needles, a latch wire mounted upon the work plate for automatically controlling the latches of the needles, adjustable abutting means carried by the guide bars and engageable with the slides, vertically adjustable hangers for the said guide bars, and horizontally adjustable yokes mounted upon the main frame and supporting the said hangers.

29. In a knitting machine of the character described, a main frame, a superframe supported thereby and having notched arms, a plurality of warp beams adjustably engaging the notched arms, flexible weighted brake straps acting upon the said beams, chain pattern mechanism supported by the main frame, laterally movable guide bars mounted in the main frame, means for angularly adjusting the guide bars with relation to each other, thread guides mounted upon said guide bars, slides arranged between the said guide bars and the pattern chain mechanism and operative by the latter for laterally shifting the said guide bars, vertically, horizontally and diagonally movable needles cooperative with the thread guides, means for horizontally shifting the needles, reciprocating means for controlling the vertical and diagonal movements of the needles, take-up mechanism arranged below the said needles, means for adjusting the relative position of the take-up mechanism with respect to the said needles, an adjustable work plate arranged at one side of the needles, a latch wire mounted upon the work plate for automatically controlling the latches of the needles, adjustable abutting means carried by the guide bars and engageable with the slides, vertically adjustable hangers for the said guide bars, horizontally adjustable yokes mounted upon the main frame and supporting the said hangers, and operating connections between the pattern chain mechanism, needles and take-up mechanism.

30. In a knitting machine, movable thread guides, means for angularly adjusting the said thread guides, a reciprocating needle carriage, vertically movable lift rods mounted in the carriage, a needle bar fixed to the lift rods, and reciprocating cams operating upon said lift rods for vertically and diagonally moving the needle bar.

31. In a knitting machine, movable thread guides, means for angularly adjusting the said thread guides, a reciprocating needle carriage, vertically movable lift rods mounted in the carriage, a needle bar fixed to the lift rods, reciprocating cams operating upon said lift rods for vertically and diagonally moving the needle bar, and fixed cams acting upon the lift rods for positively lowering the same.

32. In a knitting machine, movable thread guides, means for angularly adjusting the said thread guides, a reciprocating needle carriage, vertically movable lift rods mounted in the carriage, a needle bar fixed to the lift rods, reciprocating cams operating upon said lift rods for vertically and diagonally moving the needle bar, fixed cams acting upon the lift rods for positively lowering the same, and pattern chain controlled mechanism for imparting movement to the thread guides.

33. In a knitting machine, movable thread guides, means for angularly adjusting the said thread guides, a reciprocating needle carriage, vertically movable lift rods mounted in the carriage, a needle bar fixed to the lift rods, reciprocating cams operating upon said lift rods for vertically and diagonally moving the needle bar, fixed cams acting upon the lift rods for positively lowering the same, pattern chain controlled mechanism for imparting movement to the thread guides, and means for simultaneously imparting movement to the carriage, movable cams, and the pattern chain mechanism.

34. In a knitting machine, movable thread guides, means for angularly adjusting the said thread guides, a reciprocating needle carriage, vertically movable lift rods mounted in the carriage, a needle bar fixed to the lift rods, reciprocating cams operating upon said lift rods for vertically and diagonally moving the needle bar, fixed cams acting upon the lift rods for positively lowering the same, pattern chain controlled mechanism for imparting movement to the thread guides, means for simultaneously imparting movement to the carriage, movable cams, and the pattern chain mechanism, and an adjustable take-up mechanism supported below the carriage.

35. In a knitting machine, movable thread guides, means for angularly adjusting the said thread guides, a reciprocating needle carriage, vertically movable lift rods mounted in the carriage, a needle bar fixed to the lift rods, reciprocating cams operating upon said lift rods for vertically and diagonally moving the needle bar, fixed cams acting upon the lift rods for positively lowering the same, pattern chain controlled mechanism for imparting movement to the thread guides, means for simultaneously imparting movement to the carriage, movable cams, and the pattern chain mechanism, an adjustable take-up mechanism supported below the carriage, and means for deflecting the finished work from the take-up mechanism.

36. In a knitting machine, movable thread guides, means for angularly adjusting the said thread guides, a reciprocating needle carriage, vertically movable lift rods mounted in the carriage, a needle bar fixed to the lift rods, reciprocating cams operating upon said lift rods for vertically and diagonally moving the needle bar, fixed cams acting upon the lift rods for positively lowering the same, pattern chain controlled mechanism for imparting movement to the thread guides, means for simultaneously imparting movement to the carriage, movable cams, and the pattern chain mechanism, an adjustable take-up mechanism supported below the carriage, means for deflecting the finished work from the take-up mechanism, and means for permitting the adjustment of the lift rods for the positioning of the needles on either side of a perpendicular line.

37. In a knitting machine, a row of movable needles, a series of slidable thread guides movable at right angles to the path of movement of the needles, means for angularly adjusting the thread guides independently of each other, means for imparting movement to the thread guides, and mechanism for vertically, horizontally and obliquely moving the said needles.

38. In a knitting machine, a row of movable needles, a series of slidable thread guides movable at right angles to the path of movement of the needles, means for angularly adjusting the thread guides independently of each other, means for imparting movement to the thread guides, mechanism for vertically, horizontally and obliquely moving the said needles, and means for vertically adjusting the thread guides.

39. In a knitting machine, a row of movable needles, a series of slidable thread guides movable at right angles to the path of movement of the needles, means for angularly adjusting the thread guides independently of each other, means for imparting movement to the thread guides, mechanism for vertically, horizontally and obliquely moving the said needles, means for vertically adjusting the thread guides, and means acting on the thread guides for imparting return movement thereto.

40. In a knitting machine, movable thread guides, a row of movable needles, means for vertically moving the said needles, means for horizontally moving the said needles, adjustable means for obliquely moving the said needles, and pattern chain mechanism actuating the thread guides.

41. In a knitting machine, movable thread guides, a row of movable needles, means for vertically moving the said needles, means for horizontally moving the said needles, adjustable means for obliquely moving the said needles, pattern chain mechanism actuating the thread guides, and means acting upon the thread guides to hold the same in positive operative relation to the pattern chain mechanism.

42. In a knitting machine, movable thread guides, a row of movable needles, means for vertically moving the said needles, means for horizontally moving the said needles, adjustable means for obliquely moving the said needles, pattern chain mechanism actuating the thread guides, means acting upon the thread guides to hold the same in positive operative relation to the pattern chain mechanism, warp thread feed mechanism arranged above the said thread guides, and means for tensioning the thread fed from the said mechanism.

43. In a knitting machine, the combination with a plurality of independently reciprocable thread guide carriers, of pattern chains which directly and positively actuate the respective thread guide carriers in relation to each other to effect relative shifting or displacement of the threads, and a needle bar mounted for bodily movement or displacement in a direction transverse to its length and to the lengths of the thread guide carriers having needles which are adapted to crosswise traverse the thread guides during the movements of the needle bar.

44. In a knitting machine, the combination with a plurality of independently reciprocable thread guide carriers, of independent pattern chains which directly and positively actuate the respective thread guide carriers in relation to each other to effect relative shifting of the threads, said chains being composed of detachably connected links adapted for selective arrangement as to character and sequence, and a needle bar mounted for bodily movement or displacement in a direction transverse to its length and to the lengths of the thread guide carriers having needles which are adapted to crosswise traverse the thread guides during the movements of the needle bar.

45. In a knitting machine, the combination with a plurality of thread guide carriers adapted to reciprocate in fixed straight paths, of selectively arranged and composed pattern chains, one for each carrier, which directly actuate the respective carriers in relation to each other to effect relative shifting or displacement of the threads, and a needle bar mounted for bodily movement or displacement in a direction transverse to its length and to the lengths of the thread guide carriers having needles which are adapted to crosswise traverse the thread guides during the movements of the needle bar.

46. In a knitting machine, the combination with reciprocable thread guide carriers, of pattern controlling means which directly and positively actuates said thread guide carriers, a needle bar mounted for bodily movement only in a direction transverse to its length and arranged for general lateral movement in relation to the thread guide carriers, needles carried thereby, and operating means therefor timed to pass the needles between the thread guides of the respective carriers in general lateral traversing relation thereto.

47. In a knitting machine, the combination with a plurality of independently reciprocable thread guide carriers, of pattern controlling means comprising jointly operating selectively arranged devices which directly and positively actuate the respective thread guide carriers, a needle bar mounted for bodily movement only in a direction transverse to its length and arranged for general lateral movement in relation to the thread guide carriers, needles carried thereby, and operating means therefor timed to pass the needles between the thread guides of the respective carriers in general traversing relation thereto.

48. In a knitting machine, the combination with a plurality of reciprocable thread guide carriers, of pattern chains which directly and positively actuate the respective thread guide carriers, said chains being composed of detachably connected links adapted for selective arrangement as to character and sequence, a needle bar mounted for bodily movement only in a direction transverse to its length and arranged for general lateral movement in relation to the thread guide carriers, needles carried thereby, and operating means therefor timed to pass the needles between the thread guides of the respective carriers in general lateral traversing relation thereto.

49. In a knitting machine, the combination with a plurality of slidable thread guide carriers, of pattern controlling means, and slides cooperating with the thread guide carriers and the pattern controlling means through which the pattern controlling means directly and positively actuates the thread guide carriers in relation to each other to effect relative shifting of the threads, and a needle bar mounted for bodily movement or displacement in a direction transverse to its length and to the lengths of the thread guide carriers having needles which are adapted to crosswise traverse the thread guides during the movements of the needle bar.

50. In a knitting machine, the combination with a plurality of slidable thread guide carriers, of independent pattern chains composed of detachably connected links adapted for selective arrangement as to character and sequence, and slides constituting a direct and positive operative connection between the pattern chains and thread guide carriers whereby the latter are moved in relation to each other to effect relative shifting of the threads, and a needle bar mounted for bodily movement or displacement in a direction transverse to its length and to the lengths of the thread guide carriers having needles which are adapted to crosswise traverse the thread guides during the movements of the needle bar.

51. In a knitting machine, the combination with a plurality of slidable thread guide carriers, of independent pattern chains, slides directly operable by the pattern chains, and spring means maintaining the thread guide carriers in engagement with the slides whereby the carriers are directly and positively shifted in relation to each other by the pattern chains to effect relative shifting of the threads, and a needle bar mounted for bodily movement or displacement in a direction transverse to its length and to the lengths of the thread guide carriers having needles which are adapted to crosswise traverse the thread guides during the movements of the needle bar.

52. In a knitting machine, the combination with a plurality of slidable thread guide carriers, of pattern chains for directly and positively shifting said carriers to effect relative shifting of the threads and means whereby the carriers may be adjusted in relation to the pattern chains, and a needle bar mounted for bodily movement or displacement in a direction transverse to its length and to the lengths of the thread guide carriers having needles which are adapted to crosswise traverse the thread guides during the movements of the needle bar.

53. A controlling device comprising a drum having ribs provided with notches, and pattern chains each composed of links having detachable connecting pivots and also provided with driving lugs located intermediate the pivots, said chains being arranged side by side on the drum and having their pivots and lugs projecting freely from the outer faces of the links and received in the notches.

54. In a knitting machine, the combination with thread guide bars which are adapted to reciprocate only in the direction of their length, of a needle bar mounted for horizontal and vertical sliding movement or displacement in a direction transverse to its length and to the lengths of the thread guide bars, and a plurality of operating means for the needle bar each being adapted for adjustment to jointly determine the characteristics of the travel of said needle bar transversely to the guide bars.

55. In a knitting machine, the combination with thread guide bars movable only in the direction of their length, and thread guides carried thereby, of a needle bar, and needles carried thereby, said needle bar being mounted for only horizontal and vertical sliding movements crosswise in relation to said thread guide bars and adapted to cause the needles to pass and repass the thread guides in crosswise traversing relation thereto.

In testimony whereof, I hereunto affix my signature.

ISAAC SPRINGTHORPE.